United States Patent
Susai et al.

(10) Patent No.: US 6,725,272 B1
(45) Date of Patent: Apr. 20, 2004

(54) APPARATUS, METHOD AND COMPUTER PROGRAM PRODUCT FOR GUARANTEED CONTENT DELIVERY INCORPORATING PUTTING A CLIENT ON-HOLD BASED ON RESPONSE TIME

(75) Inventors: Michel K. Susai, San Jose, CA (US); Anil Shetty, Corpus Christi, TX (US); Wanqun Bao, San Jose, CA (US); Jose K. Raphel, San Jose, CA (US); Rajiv Sinha, San Jose, CA (US); Venugopal Botlaguduru, Newark, CA (US); Sivaprasad R. Udupa, Sunnyvale, CA (US); Vamsimohan Korrapati, Sunnyvale, CA (US); Sergey Verzunov, Campbell, CA (US)

(73) Assignee: Netscaler, Inc., Santa Clara, CA (US)

( * ) Notice: Subject to any disclaimer, the term of this patent is extended or adjusted under 35 U.S.C. 154(b) by 0 days.

(21) Appl. No.: 09/506,747

(22) Filed: Feb. 18, 2000

(51) Int. Cl.⁷ .............................................. G06F 15/173
(52) U.S. Cl. ...................................... 709/229; 709/238
(58) Field of Search ................................ 709/203, 219, 709/217, 229, 225, 227, 238

(56) References Cited

U.S. PATENT DOCUMENTS

| 4,858,120 A | 8/1989 | Samuelson | 705/11 |
| 5,774,670 A | 6/1998 | Montulli | 395/200.57 |

(List continued on next page.)

OTHER PUBLICATIONS

Copy of International Search Report issued Jun. 29, 2001, for Application No. PCT/US01/05233, 2 pages.

Zheng Wang et al., "Prefetching in World Wide Web," University College London, United Kingdom, Nov. 18–22, 1996, pp. 1–12.

Mogul, Jeffrey C., "The Case for Persistent–Connection HTTP," Computer Communication Review Conference, Aug. 1995, vol. 25, No. 4, pp. 299–313.

Egevang K. and Francis P., "The IP Network Address Translator (NAT)," Request for Comments: 1631, May 1994, http://www.safety.net/rfcl1631.txt, 9 pages.

*Primary Examiner*—Dung C. Dinh
(74) *Attorney, Agent, or Firm*—Sterne Kessler Goldstein and Fox P.L.L.C.

(57) ABSTRACT

An apparatus, method and computer program product for guaranteeing network client-server response time while providing a way of putting the client on-hold when the response time temporarily prohibits, access to the requested server. The apparatus is implemented within an interface unit connecting a plurality of servers and an on-hold server to the Internet, which is connected to a plurality of clients. According to one aspect of the invention, the method includes the steps of opening a connection between a client and the interface unit; determining which server the client desires a page from; determining the current response time of the requested server; if the response time is acceptable then opening a connection between the interface unit and the requested server if no free connection is open between the interface unit and the requested server; allowing the client to access information on the requested server via the connections; and closing the connection between the client and the interface unit while keeping open the connection between the interface unit and the requested server. Alternatively, if the response time is not acceptable, then putting the client on-hold by redirecting the client to an on-hold server until the response time of the requested server becomes acceptable. According to a "on-hold distribution" aspect of the invention, the interface unit determines the on-hold preference of the client and selects the server hosting that on-hold preference. According to another aspect of the invention, instead of utilizing the interface unit, each server has the intelligence to put the client on-hold when applicable.

22 Claims, 11 Drawing Sheets

U.S. PATENT DOCUMENTS

| | | | |
|---|---|---|---|
| 5,777,989 A | | 7/1998 | McGarvey .................. 370/254 |
| 5,787,470 A | | 7/1998 | DeSimone et al. ......... 711/124 |
| 5,812,780 A | | 9/1998 | Chen et al. ................. 709/224 |
| 5,852,717 A | | 12/1998 | Bhide et al. ........... 395/200.33 |
| 5,896,500 A | * | 4/1999 | Ludwig et al. ........ 395/200.34 |
| 5,918,013 A | | 6/1999 | Mighdoll et al. ...... 395/200.47 |
| 5,941,988 A | | 8/1999 | Bhagwat et al. ............ 713/201 |
| 5,943,321 A | * | 8/1999 | St-Hilaire et al. .......... 370/259 |
| 6,173,322 B1 | | 1/2001 | Hu .............................. 709/224 |
| 6,178,446 B1 | * | 1/2001 | Gerszberg et al. .......... 709/217 |
| 6,295,551 B1 | * | 9/2001 | Roberts et al. ............. 709/205 |
| 6,397,253 B1 | * | 5/2002 | Quinlan et al. ............. 709/227 |
| 6,411,986 B1 | | 6/2002 | Susai et al. ................. 709/203 |
| 6,438,597 B1 | * | 8/2002 | Mosberger et al. ......... 709/227 |
| 6,457,054 B1 | * | 9/2002 | Bakshi ....................... 709/227 |

* cited by examiner

APPARATUS, METHOD AND COMPUTER PROGRAM PRODUCT FOR GUARANTEED CONTENT DELIVERY INCORPORATING PUTTING A CLIENT ON-HOLD BASED ON RESPONSE TIME

CROSS-REFERENCE TO RELATED APPLICATIONS

The present application is related to application Ser. No. 09/188,709, filed Nov. 10, 1998, U.S. Pat No. 6,411,986 titled "Internet Client-Server Multiplexer," incorporated herein by reference in its entirety.

BACKGROUND OF THE INVENTION

1. Field of the Invention

The present invention relates generally to Internet client-server applications, and more specifically to guaranteeing network client-server response time while providing a way of putting the client on-hold when the response time temporarily prohibits access to the requested server.

2. Related Art

The importance to the modern economy of rapid information and data exchange cannot be understated. This explains the exponentially increasing popularity of the Internet. The Internet is a world-wide set of interconnected computer networks that can be used to access a growing amount and variety of information electronically.

One method of accessing information on the Internet is known as the World Wide Web (www, or the "web"). The web is a distributed, hypermedia system and functions as a client-server based information presentation system. Information that is intended to be accessible over the web is stored in the form of "pages" on general-purpose computers known as "servers." Computer users can access a web (or HTML) page using general-purpose computers, referred to as "clients," by specifying the uniform resource locator (URL) of the page. FIG. 1 is a network block diagram showing a plurality of clients and servers connected to the Internet.

When a client specifies a URL, a part of the URL known as the Domain Name is passed to a domain server (DNS) to be translated to a network address. The network address specifies the Internet protocol (IP) address of the intended or requested server. The client request is passed to the requested server having the network address. This process of how the client request eventually arrives at the requested server is operating in virtual IP mode. In this mode, the address of the requested server is never published and thus not accessible to the client. Here, the server uses the path name in the URL to locate the web page requested by the client. A copy of the web page is then sent to the client for viewing by the user. A second mode, called standard mode, will be briefly described next.

In standard mode, the actual address of the requested server is published. Here, the client's specified URL does not include the Domain Name. Therefore, the request does not go through the DNS to eventually arrive at the requested server.

The client-server paradigm described above has served the Internet well. However, there are some problems. One problem is unacceptable server response time when too many clients are requesting a page from the same server. In fact, when this number of clients (i.e., users) exceeds a certain threshold, often times the result is a server failure or crash. A computer crash means that the computer itself stops working or that a program aborts unexpectedly. A crash signifies either a hardware malfunction or a very serious software bug. When the response time for a server is unacceptably slow and/or has a tendency to crash often, the owner of the server may lose business. This loss of business is detrimental to a business person who mainly conducts his or her business on the Internet.

Increasing server response time to a client request may be the result of several factors. One such factor is multitasking. Multitasking, which is well known in the relevant art(s), is the ability to execute more than one task (e.g., URL or page request) at the same time. In multitasking, only one central processing unit (CPU) is involved, but it switches from one task to another so quickly that it attempts to give the appearance of executing all of the tasks at the same time. There are two basic types of multitasking: preemptive and cooperative. In preemptive multitasking, the operating system parcels out CPU time slices to each task. In cooperative multitasking, each task can control the CPU for as long as it needs it. If a task is not using the CPU, however, it can allow another task to use it temporarily. OS/2, Windows 95, Windows NT, the Amiga operating system and UNIX use preemptive multitasking, whereas Microsoft Windows 3.x and the MultiFinder (for Macintosh computers) use cooperative multitasking.

Whether the operating system of a particular server uses preemptive or cooperative multitasking, the response time to URL (page) requests increases as the number of requests increases. Under certain load conditions, these page requests can represent a considerable overhead, consuming a large percentage of the server's processing resources. What is needed is a way of guaranteeing the response time to a client's page request at a particular server (or web site), and thereby avoid wasting valuable server CUP time and crashes. In addition, what is needed is a way of providing alternative information to the user (via the client) when the server containing the desired page is not available. By providing alternative information to the user it helps to not only generate possible related business but also redirects the user back to the desired page once the server is free.

SUMMARY OF THE INVENTION

The present invention is an apparatus, method and computer program product for guaranteeing network client-server response time while providing a way of putting the client on-hold when the response time temporarily prohibits access to the requested server. In a preferred embodiment, the present invention is implemented within an interface unit connecting a plurality of servers to the Internet, which is in turn connected to a plurality of clients and on-hold server(s).

According to a preferred embodiment of the present invention, the method includes the steps of opening a connection between a client land the interface unit; determining which server the client desires a page from; determining the current response time of the requested server; if the response time is acceptable then opening a connection between the interface unit and the requested server if no free connection is open between the interface unit and the requested server; allowing the client to access information on the requested server via the connections; and closing the connection between the client and the interface unit while keeping open the connection between the interface unit and the requested server. Alternatively, if the response time is not acceptable, then putting the client on-hold by redirecting the client to an on-hold server until the response time of the requested server becomes acceptable.

In another embodiment of the present invention, instead of utilizing the interface unit, each server has the intelligence to put the client on-hold when applicable.

According to an "on-hold distribution" aspect of the invention, the interface unit determines the on-hold preference of the client and selects the server hosting that on-hold preference.

One advantage of the present invention is that it guarantees a response time to a client once the client is allowed to access the requested server.

Another advantage of the present invention is that it eliminates one reason for server crashes, too many page requests at the same time.

Yet another advantage of the present invention is that it temporarily puts a client on-hold, and once the requested server is ready to service the client, redirects the client back to the requested server. Putting the client on-hold both helps to generate additional business from the client on other servers and ensures that the client will be eventually redirected back to the requested server.

Another advantage of the present invention is that clients who use the present on-hold invention will be given preferential access over non-clients when attempting to gain access to the requested server (in the case where both clients and non-clients of the present invention can request a web page or content from the requested server).

Another advantage of the present invention is that it provides the flexibility to a user (via the client) to specify his or her on-hold preference through use of a technique referred to herein as "on-hold distribution."

BRIEF DESCRIPTION OF THE FIGURES

The features and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

The present invention is an apparatus, method and computer program product for guaranteeing network client-server response time while providing a way of putting the client on-hold when the response time temporarily prohibits access to the requested server.

Figure 1:
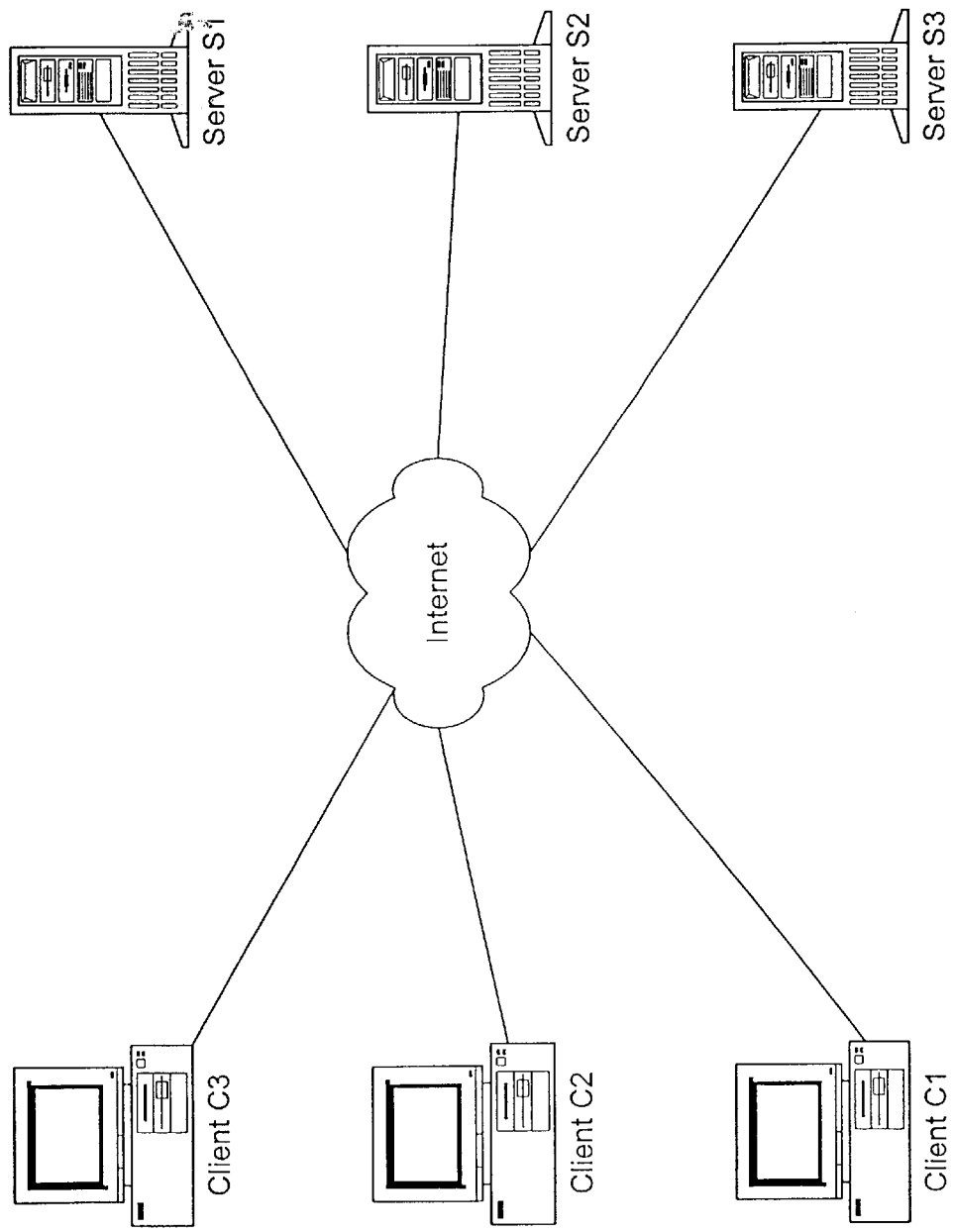
FIG. 1 is a network block diagram showing a plurality of clients and servers connected to the Internet.
Figure 2:
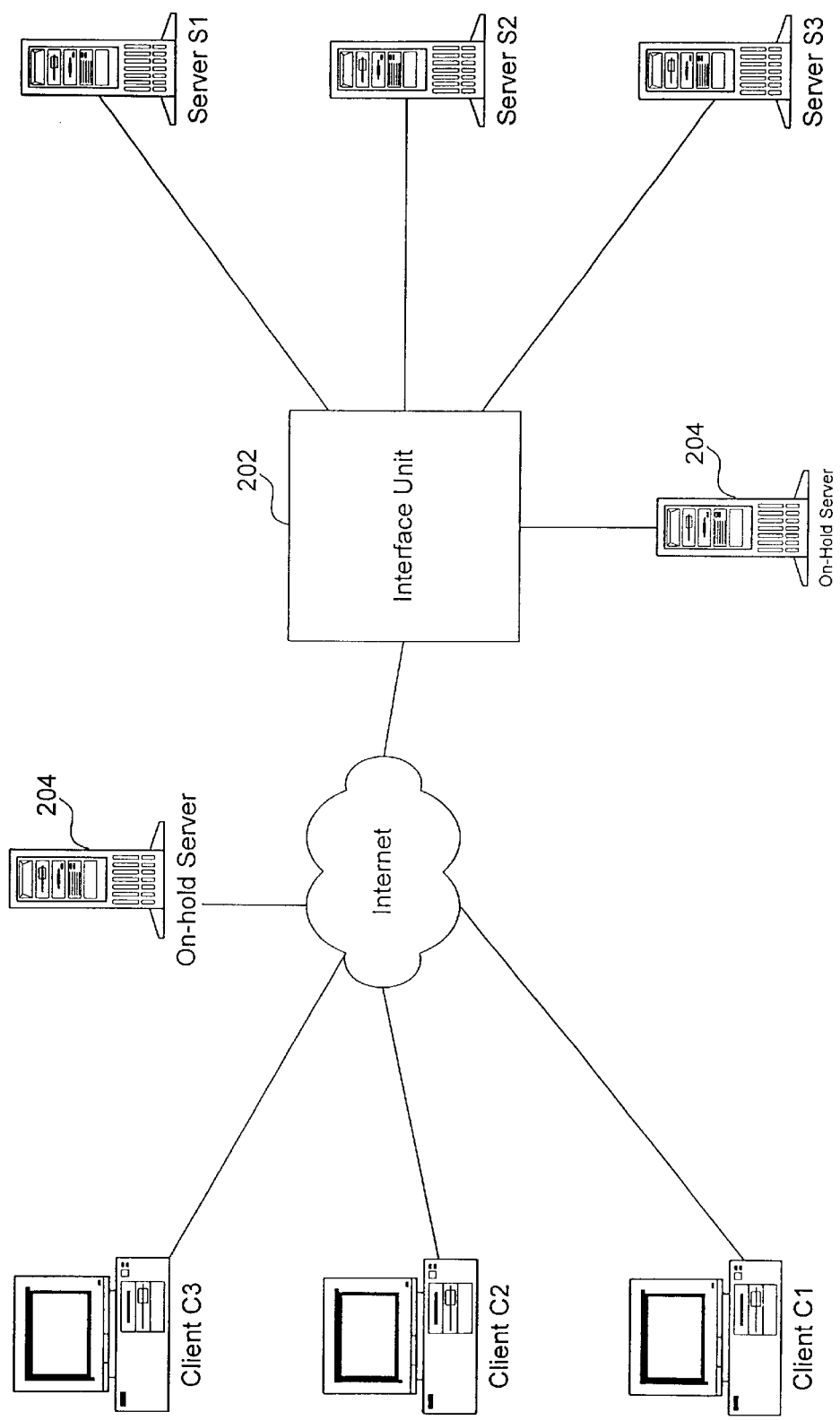
FIG. 2 is a network context diagram for an interface unit and on-hold server(s) according to a preferred embodiment of the present invention.

FIG. 2 is a network context diagram for an interface unit 202 and an on-hold server(s) 204 according to a preferred embodiment of the present invention. In a preferred embodiment, interface unit 202 is an intelligent network interface card with a CPU inside a server. Interface unit 202 can also be intelligent box sitting outside the server, in which case it can serve more than one server. Interface unit 202 can also be a load balancer, bandwidth manager firewall, proxy-cache, router, switch, computer system, or any other network device that is located between a client and server. In theory, on-hold server 204 represents the world's largest web site. Users (via clients) are temporarily redirected to on-hold server 204 when their requested server is too busy to accommodate their page requests. On-hold server(s) 204 may be physically located within interface unit 202, may be an independent server directly connected to interface unit 202 or may be an independent server located anywhere on the Internet.

Referring to FIG. 2, a plurality of clients C1, C2, C3 are coupled to the Internet. A plurality of servers S1, S2, S3, and on-hold server 204 are coupled to the Internet by interface unit 202 (or alternatively, on-hold server 204 may be located anywhere on the Internet). Servers S1, S2, S3 are collectively referred to as a "server farm." On-hold server 204 may be a single server or a plurality of servers. In a preferred embodiment of the present invention, all Internet traffic with the server farm passes through interface unit 202. In another embodiment, instead of utilizing interface unit 202, each server may have its own on-hold server and the intelligence to put the client on-hold when applicable, as described below with reference to FIG. 10. While the present invention is described in terms of the Internet, the concepts described also apply to other types of networks, as will be apparent to one skilled in the relevant art.

Interface unit 202 relieves servers S1, S2, S3 of much of the processing load caused by repeatedly opening and closing connections to clients by opening one or more connections with each server and maintaining these connections to allow repeated data accesses by clients via the Internet. This technique is referred to herein as "connection pooling." Interface unit 202 also transparently splices connections from servers and clients using a technique referred to herein as "connection multiplexing." The techniques of "connection pooling" and "connection multiplexing" are described in detail in related pending application Ser. No. 09/188,709, filed Nov. 10, 1998, titled "Internet Client-Server Multiplexer," incorporated herein by reference in its entirety.

Figure 3:
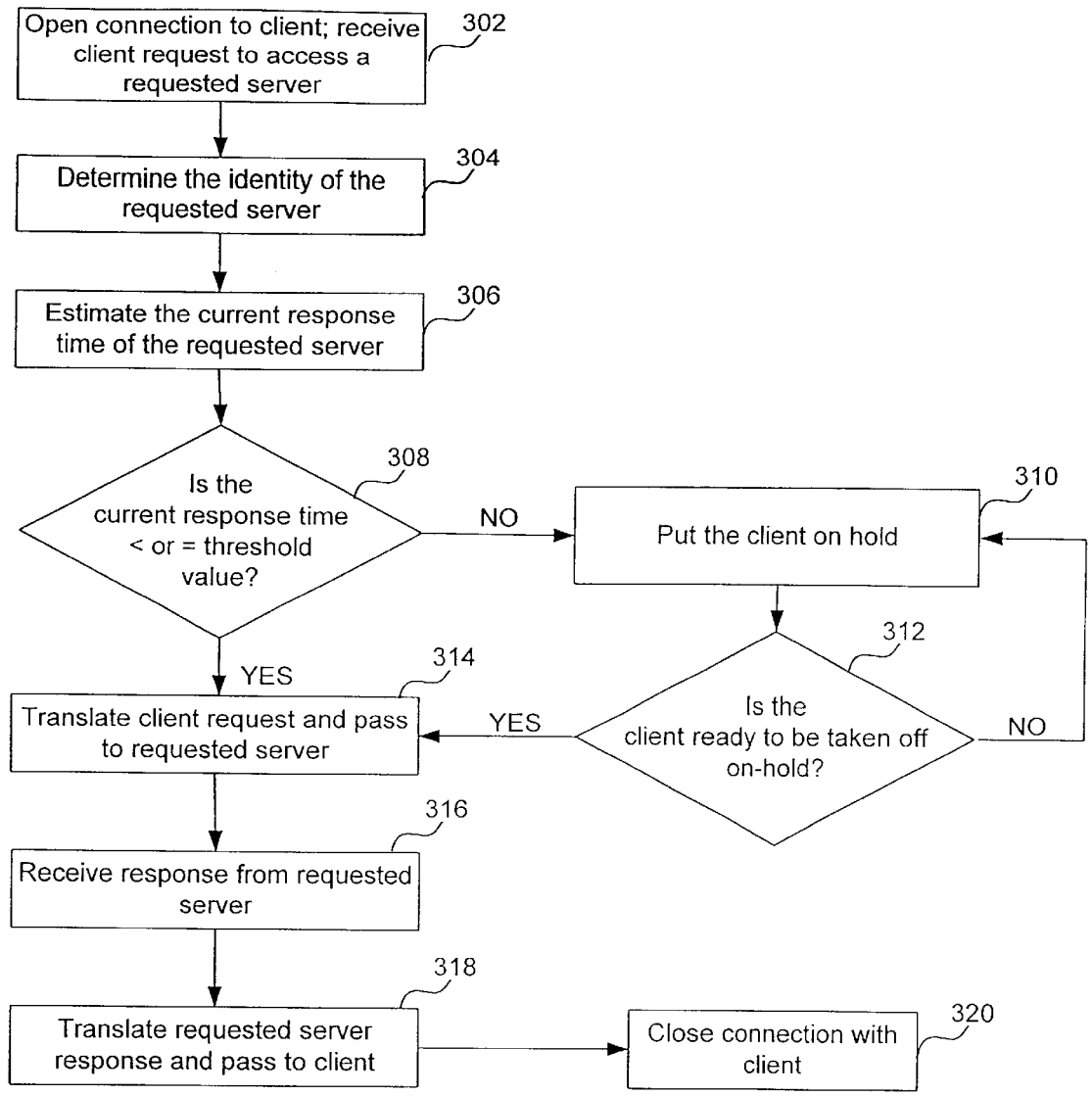
FIG. 3 is a flowchart illustrating the high level operation of the present invention according to a preferred embodiment.

FIG. 3 is a flowchart illustrating the operation of the present invention with respect to the network client-server guaranteed response time and on-hold aspects of the present invention according to a preferred embodiment. FIG. 3 incorporates the "connection pooling" and "connection multiplexing" techniques mentioned above. As described above, interface unit 202 may operate in either virtual IP and/or standard mode. When operating in virtual IP mode, the process begins when a client requests access to one of the servers in the server farm (herein referred to as the "requested server") tended by interface unit 202. A connection is opened between interface unit 202 and the requesting client, and interface unit 202 receives the client request to access the requested server, as shown in step 302. (Note that in standard mode, the client request would not be addressed to interface unit 202.)

Interface unit 202 determines the identity of the requested server as shown in step 304. In one embodiment, this is accomplished by examining the destination network address specified by the client request. In another embodiment, this is accomplished by examining the network address and path name specified by the client request. After determining the identity of the server to which the client request should be directed, interface unit 202 utilizes the "connection pooling" technique by determining whether a free connection (that is, one that is not in use) to the requested server is already open. If not, interface unit 202 opens a connection to the server.

In step 306, interface unit 202 estimates the current response time of the requested server. The current response time of the requested server is estimated by interface unit 202 by using actual past response times as described next. However, other techniques for determining the response time can be used as should be readily apparent to one skilled in the art. Let $t_i$ denote the response time at the $i^{th}$ episode (i.e., actual past response time). Let $t_1$ denote the estimated response time at the ith episode. The response time is estimated by the following recurrence relation:

$$t_{(i+1)}'=(((i-1)*(t_{i-1})+(t_i*i))/(2i-1))+(t_i'-t_i)*K, \text{ where } K \text{ is a constant of error correction.}$$

The coefficient K is learned from the on-going traffic beginning with constant, and proceeding to liner, polynomial exponential changes in the error value. Thus the estimated response time characteristic assumes the actual response time. The constant is selected so as to underestimate the response time characteristic so as to ensure the user expectations.

There are several embodiments of this solution. One is that the time is measured as the time for completing an HTTP GET transaction. Another embodiment is to measure the time normalized by the number of bytes transferred.

The response time for the plurality of the servers connected to interface unit 202 is computed as the minimum of the response time of the servers behind it when access is through a load balancer, or on a per server basis.

The estimated current response time is then compared to a threshold value in step 308. The threshold value represents the maximum response time allowed for the current client (i.e., user) to gain access to the requested server. The threshold value is configurable by each server in the server farm and therefore each server may have a different guaranteed response time. For example, a particular server may decide that it can service 75,000 requests with a quick response time, and up to 100,000 requests with an acceptable response time. If the server cannot provide the acceptable response time, then interface unit 202 is directed to put its clients on-hold. Thus, if the response time is greater than the threshold value, then control passes to step 310. If control passes to step 310, the client gets put on-hold. Alternatively, control passes to step 314, and the client is never put on-hold.

Interface unit 202 puts the client on-hold, as shown in step 310, and as more fully described with respect to FIG. 4A and FIG. 4B, below. While the client is on-hold there is no limit to the types of information that can be provided to the client by the present invention, including music, sports, news and so forth. It is important to note that there may be one or more on-hold servers 204 utilized by the present invention that the client may be directed to. In the case of having multiple on-hold servers 204 to chose from, the present invention may use various factors in determining which on-hold server 204 to direct the client to. These factors may include such things as client IP address, type of request and on-hold server 204 load. Hence, on-hold service may be a distributed service. An on-hold portal by definition should relinquish control to the request controller. This control switching is initiated by client-side intelligence (Java Applets/Scripts), interface memory (where the interface remembers the held requests) and on-hold server 204 initiated re-direction. The re-direction can be at the IP level or at the HTTP level.

In step 312, it is determined whether the client is ready to be taken off on-hold. Whether the client is ready to be taken off on-hold depends on several factors as described in detail with respect to FIG. 5, below. If the client is ready to be taken off on-hold, then control passes to step 314. Alternatively, control passes to step 310 and the client remains on-hold.

Interface unit 202 then translates the client request and passes it to the requested server, as shown in step 314, and as more fully described with respect to FIG. 6, below. After server processing, interface unit 202 receives a response from the requested server, as shown in step 316. The server response is translated and passed to the requesting client, as shown in step 318, and described further below. Finally, interface unit 202 closes the connection with the client as shown in step 320, and the flowchart in FIG. 3 ends. However, by utilizing the "connection pooling" and "connection multiplexing" techniques referenced above, the connection between interface unit 202 and the requested server is not disconnected. By maintaining open connections with the servers and by opening and closing connections with the client as needed, interface unit 202 frees the servers of nearly all of the connection loading problems associated with serving clients over the Internet.

Figure 4A:
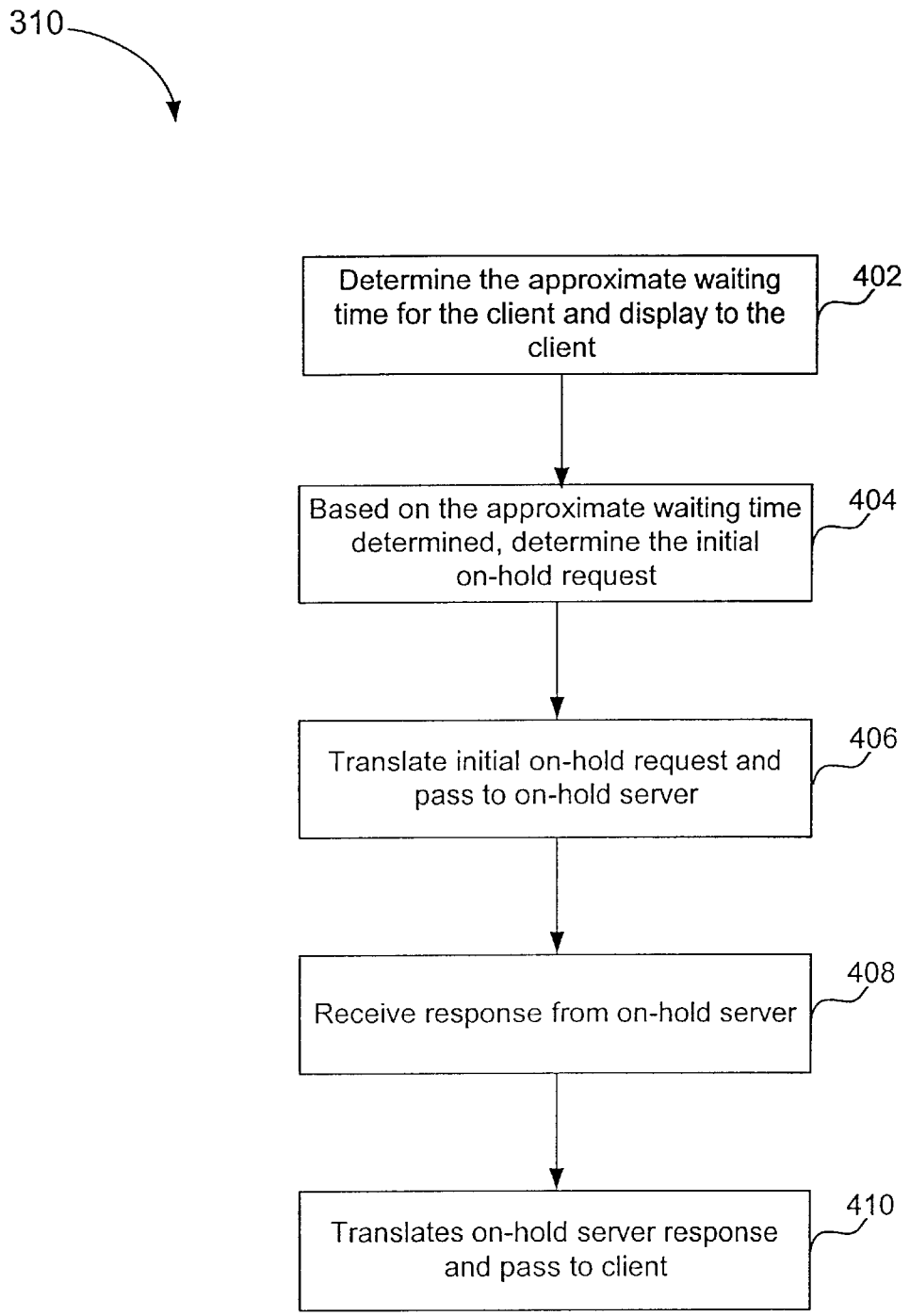
FIG. 4A is a detailed flowchart illustrating the on-hold aspect of the present invention according to a preferred embodiment.

FIG. 4A is a flowchart depicting the operation of the present invention in putting the client on-hold, as shown in step 310. In step 402, interface unit 202 determines the approximate waiting time for the client and delegates to the Java Applet/Script on the on-hold page. The Java Applet/Script corrects for the Round Trip Time (due to differing network latencies). The applet displays this corrected waiting time which is a weighted sum of the response time given by the interface unit and the network latency computed by the applet. Other factors that could be taken into consideration when calculating the waiting time includes the estimated current response time of the requested server, the number of other clients already on-hold for the requested server and so forth. One embodiment of the present invention allows a web site that maintains multiple servers to provide the user (via the client) with the flexibility to specify his or her on-hold preference through the use of a "on-hold distribution" technique. This technique is described in detail below with reference to FIG. 4B.

Depending on the approximate waiting time, interface unit 202 determines the on-hold request to be sent to on-hold server 204, in step 404. As described above, on-hold server 204 in theory represents the world's largest web site. Here, different contents (i.e., web pages) are designed to be available based on the different waiting times. When the client is redirected to on-hold server 204 by interface unit 202, interface unit 202 determines a web page associated with an initial on-hold request. The initial on-hold request can be either a default request or a client-customized request. The initial request is a default request for all clients who have not been redirected to on-hold server previously by the present invention. Both default and customized requests return web pages containing a Java Applet/Script or other code (implemented by any browser programming language). The Java Applet/Script allows the user (via the client) to request additional web pages from on-hold server 204 and also to customize the user's initial on-hold request for use in the future.

The customization of an initial on-hold request allows the user to configure the type of information (or category) to be sent to the client for display when the user is put on-hold by the present invention. In one embodiment of the present invention, the customization is achieved by returning to the user a dual framed/multi-window web (or HTML) page. Here, the first frame/window acts as a controller of the second frame/window. The second frame/window displays the medium transmitted to the user while on-hold. The first frame/window is also used to allow users to configure the contents of the second frame/window by selecting one or more categories.

Interface unit 202 then translates the initial on-hold request and passes it to on-hold server 204, as shown in step 406. After request processing, interface unit 202 receives a response from on-hold server 204, as shown in step 408. Finally, the on-hold server response is translated and passed to the requesting client, as shown in step 410, and the flowchart in FIG. 4A ends.

Figure 4B:
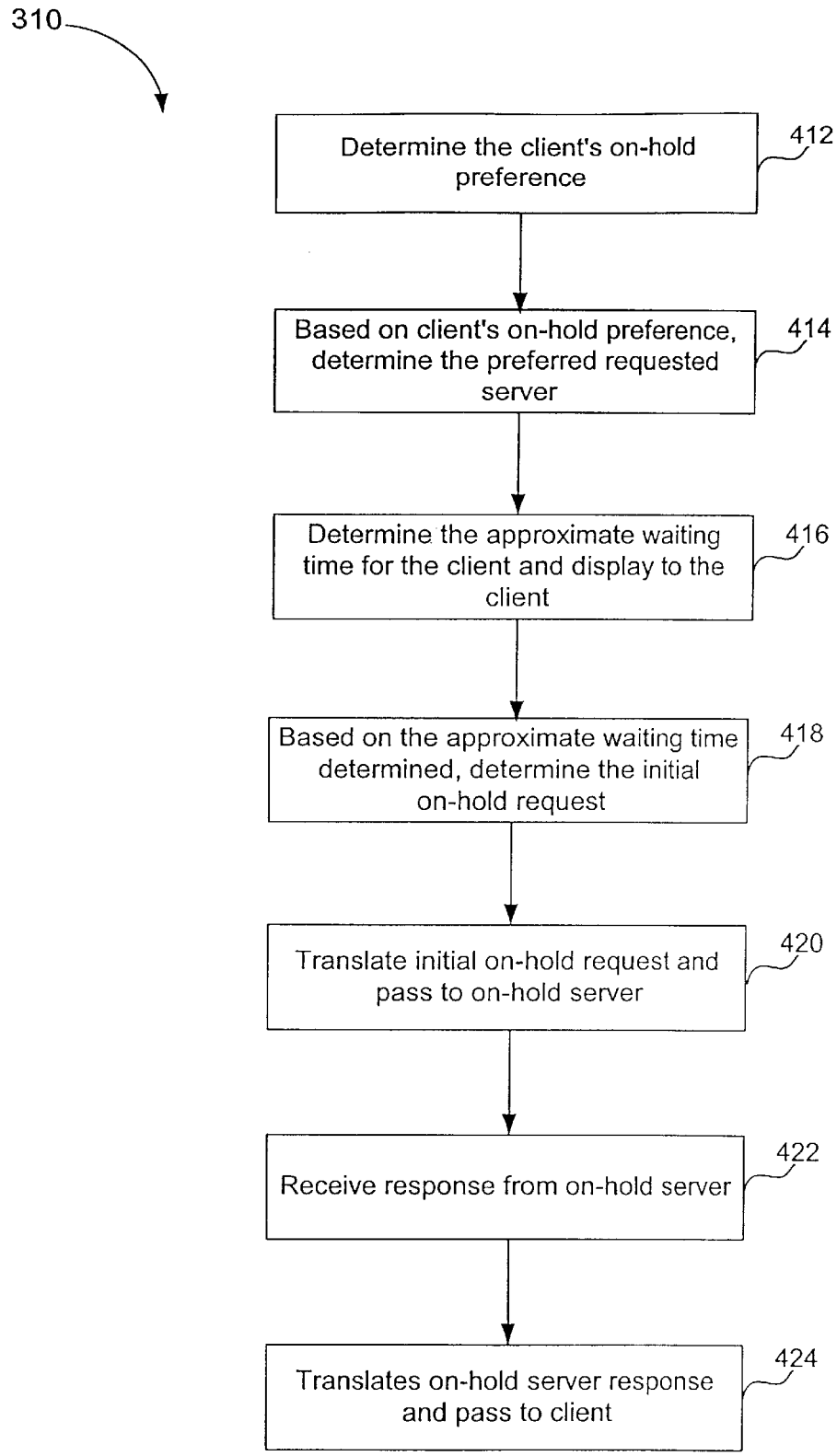
FIG. 4B is a more detailed flowchart illustrating the on-hold aspect of the present invention according to another embodiment.

FIG. 4B is a flowchart depicting the on-hold operation of the present invention incorporating the "on-hold distribution" technique, and thus a more detail description of putting the client on-hold, as shown in step 310. In step 412, interface unit 202 determines the client's on-hold preference. A web site owner who wants to provide flexibility to their clients in terms of response time may use several servers to support the web site. Each server will have a different threshold value controlling the response time the client will experience while being serviced by that particular server. Therefore, the shorter the response time, the longer a client is put on-hold by the present invention. For example, a client may desire to have a very quick response time and thus prefer to be put on-hold until they can be guaranteed the quick response time. Other clients may prefer to not be put on-hold at all (or be put on-hold for the shortest amount of time) and thus deal with a slower response time. The present invention provides flexibility to the client by allowing a client to specify his or her preferred wait time.

Referring to FIG. 4B, in step 412, interface unit 202 determines the client's (i.e., user's) on-hold preference. Here the present invention displays options to the user (via the client) for being put on-hold. Based on the client's indicated on-hold preference, interface unit 202 determines the preferred requested server, as indicated by step 414.

In step 416, interface unit 202 determines the approximate waiting time for the client and displays the approximate waiting time to the client. The approximate waiting time could be a factor of several variables, including the estimated current response time of the requested server, the number of other clients already on-hold for the requested server and so forth.

Depending on the approximate waiting time, interface unit 202 determines the on-hold request to be sent to on-hold server 204, in step 418. Again, different contents (i.e., web pages) are designed to be available based on the different waiting times. When the client is redirected to on-hold server 204 by interface unit 202, interface unit 202 determines a web page associated with an initial on-hold request, as described above.

Interface unit 202 then translates the initial on-hold request and passes it to on-hold server 204, as shown in step 420. After request processing, interface unit 202 receives a response from on-hold server 204, as shown in step 422. Finally, the on-hold server response is translated and passed to the requesting client, as shown in step 424, and the flowchart in FIG. 4B ends.

Figure 5:
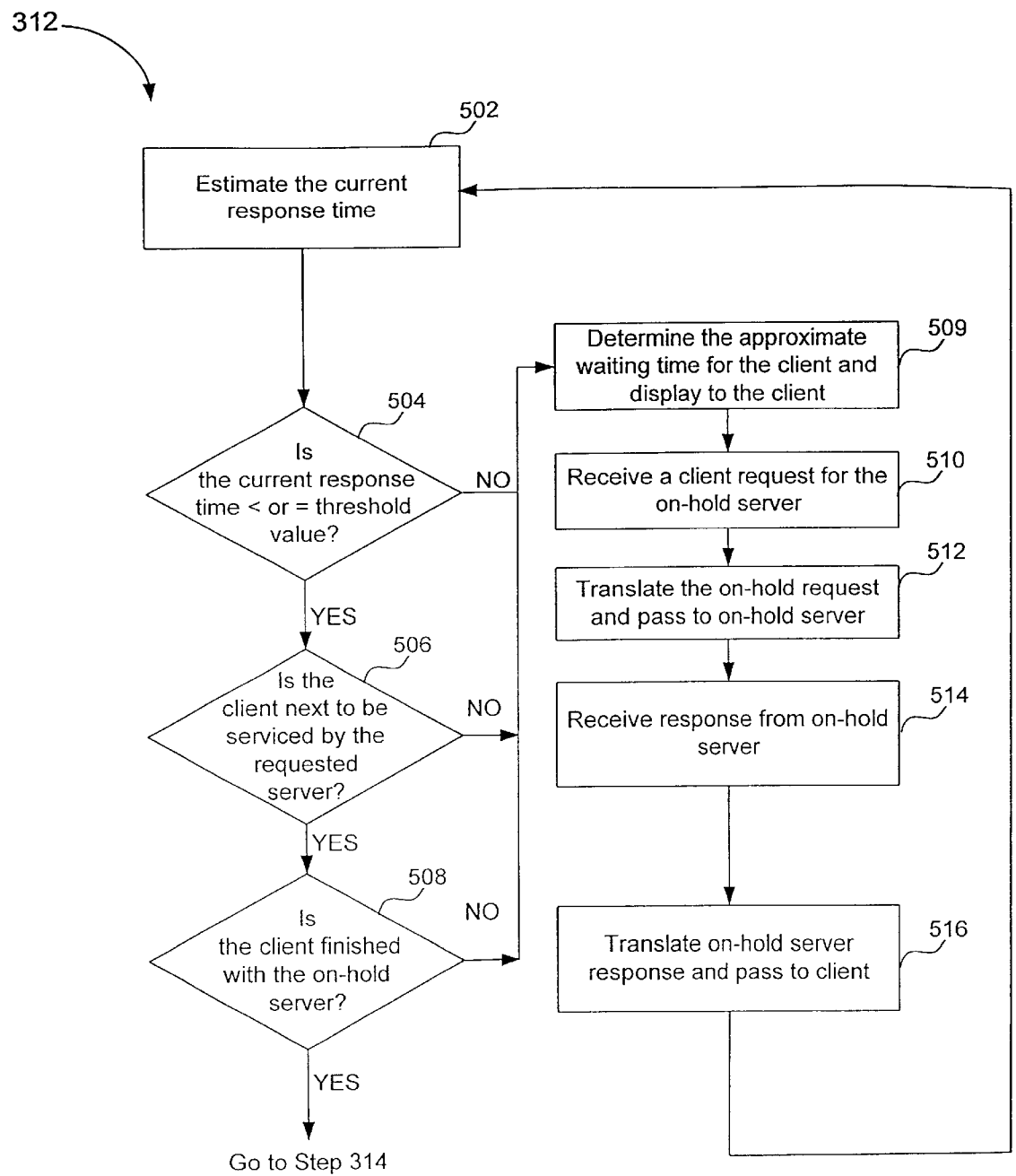
FIG. 5 is a detailed flowchart illustrating howl the present invention determines whether the client is read to be taken off on-hold according to a preferred embodiment.

FIG. 5 is a flowchart depicting the operation of the present invention in determining whether the client is ready to be taken off on-hold, as shown in step 312, according to a preferred embodiment. In step 502, interface unit 202 estimates the current response time of the requested server, as described above with reference to FIG. 3. Note that the estimated current response time changes dynamically as clients are serviced. The estimated current response time is then compared to the threshold value in step 504. The value of the threshold in FIG. 5 is the same as the value of the threshold in FIG. 3. If the response time is greater than the threshold value, then control passes to step 509. If control passes to step 509, the client remains on-hold. Alternatively, control passes to step 506.

In step 506, it is determined whether the client is next to be serviced by the requested server. Therefore, even if the estimated current response time of a server indicates the server can process another request, there may be more than one client request to be processed. Requests can be processed in various ways, including: first in, first out (FIFO); assigned priorities; last in, first out (LIFO)and so forth. If the client is next to be serviced by the requested server, then control passes to step 508. Alternatively, control passes to 509, where the client remains on-hold.

In step 508, interface unit 202 determines whether the user (via the client) is finished with on-hold server 204. For example, the user may want to finish with the page recently received from on-hold server 204. Here, if the user is not finished with on-hold server 204, another request may be serviced prior to the user's request, therefore keeping the user on-hold. If the user indicates to interface unit 202 that the user is finished with on-hold server 204, then control passes to step 324 (FIG. 3), where the user is taken off on-hold. Alternatively, interface unit 202 can automatically take the user off on-hold status without any input from the user. Therefore, there are at least two ways to abort the on-hold service of the present invention including user initiated and system initiated.

As stated above, if the user remains on-hold for one reason or another, control passes to step 509. In step 509, interface unit 202 determines the approximate waiting time for the client and displays the approximate waiting time to the client. The approximate waiting time is a dynamic value which factors in the estimated current response time of the requested server, the number of other clients already on-hold for the requested server and so forth.

In step 510, the user (via the client) is given the opportunity to make another page request to on-hold server 204. Interface unit 202 then translates the on-hold request and passes it to on-hold server 204, as shown in step 512. After request processing, interface unit 202 receives a response from on-hold server 204, as shown in step 514. Finally, the on-hold server response is translated and passed to the requesting client for display to the user, as shown in step 516. Control then passes to step 502, where the current response time is again estimated. The flowchart FIG. 5 continues until the user is taken off on-hold. FIG. 6 is a flowchart depicting the operation of the present invention in translating client and server (including on-hold server 204) requests to achieve connection multiplexing, as shown in steps 314 and 318. In a preferred embodiment, the message traffic is in the form of TCP/IP packets, a protocol suite that is well-known in the art. The TCP/IP protocol suite supports many applications, such as Telnet, File Transfer Protocol (FTP), e-mail and Hyper-Text Transfer Protocol (HTTP). The present invention is described in terms of the HTTP protocol. However, the concepts of the present invention apply equally well to other TCP/IP applications, as will be apparent to one skilled in the art after reading this specification.

Each TCP packet includes a TCP header and an IP header. The IP header includes a 32-bit source IP address and a 32-bit destination IP address. The TCP header includes a 16-bit source port number and a 16-bit destination port number. The source IP address and port number, collectively referred to as the source network address, uniquely identify the source interface of the packet. Likewise, the destination IP address and port number, collectively referred to as the destination network address, uniquely identify the destination interface for the packet. The source and destination network addresses of the packet uniquely identify a connection. The TCP header also includes a 32-bit sequence number and a 32-bit acknowledgment number.

The TCP portion of the packet is referred to as a segment. A segment includes a TCP header and data. The sequence number identifies the byte in the string of data from the sending TCP to the receiving TCP that the first byte of data in the segment represents. Since every byte that is exchanged is numbered, the acknowledgment number contains the next sequence number that the sender of the acknowledgment expects to receive. This is therefore the sequence number plus one of the last successfully received bytes of data. The checksum covers the TCP segment, i.e., the TCP header and the TCP data. This is a mandatory field that must be calculated and stored by the sender and then verified by the receiver.

In order to successfully route an inbound packet from a client to the intended server, or to route an outbound packet from a server to a client, interface unit 202 employs a process known as "network address translation." Network address translation is well-known in the art, and is specified by request for comments (RFC) 1631, which can be found at the URL http://www.safety.net/RF700631.txt.

However, in order to seamlessly splice the client and server connections, the present invention also employs the novel translation technique of "connection multiplexing" as described in detail in related pending application Ser. No. 09/188,709, filed Nov. 10, 1998, titled "Internet Client-Server Multiplexer." According to this technique, the present invention translates a packet by modifying its sequence number and acknowledgment number at the TCP protocol level. A significant advantage of this technique is that no application layer interaction is required.

Figure 6:
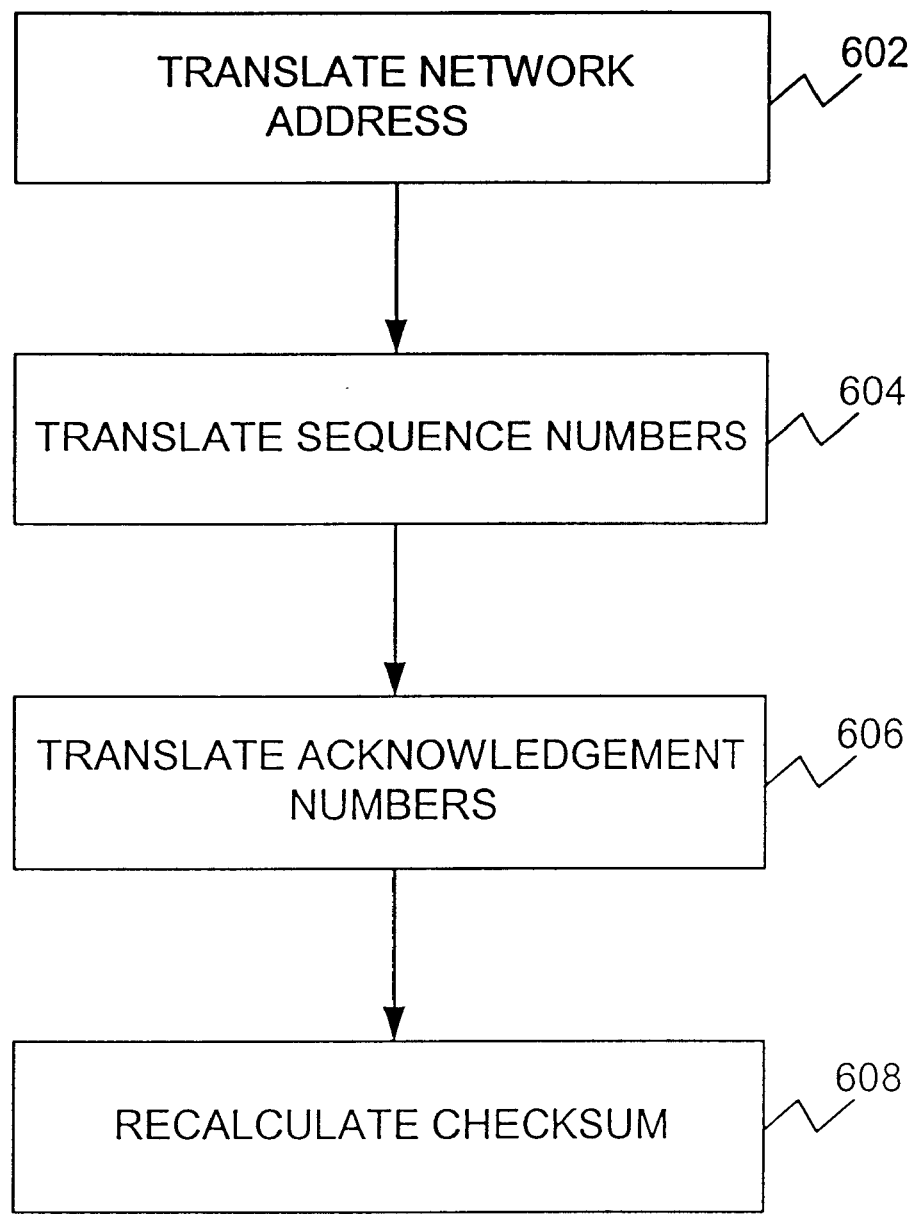
FIG. 6 is a flowchart depicting the operation of the present invention in translating client and server requests to achieve connection multiplexing.

Referring to FIG. 6, the network address of the packet is translated, as shown in step 602. In the case of an in-bound packet (that is, a packet received from a client), the source network address of the packet is changed to that of an output port of the interface unit and the destination network address is changed to that of the intended server. In the case of an outbound packet (that is, one received from a server), the source network address is changed from that of the server to that of an output port of the interface unit and the destination address is changed from that of the interface unit to that of the requesting client. The sequence numbers and acknowledgment numbers of the packet are also translated, as shown in steps 604 and 606 and described in detail below. Finally, the packet checksum is recalculated to account for these translations, as shown in step 608.

Figure 7:
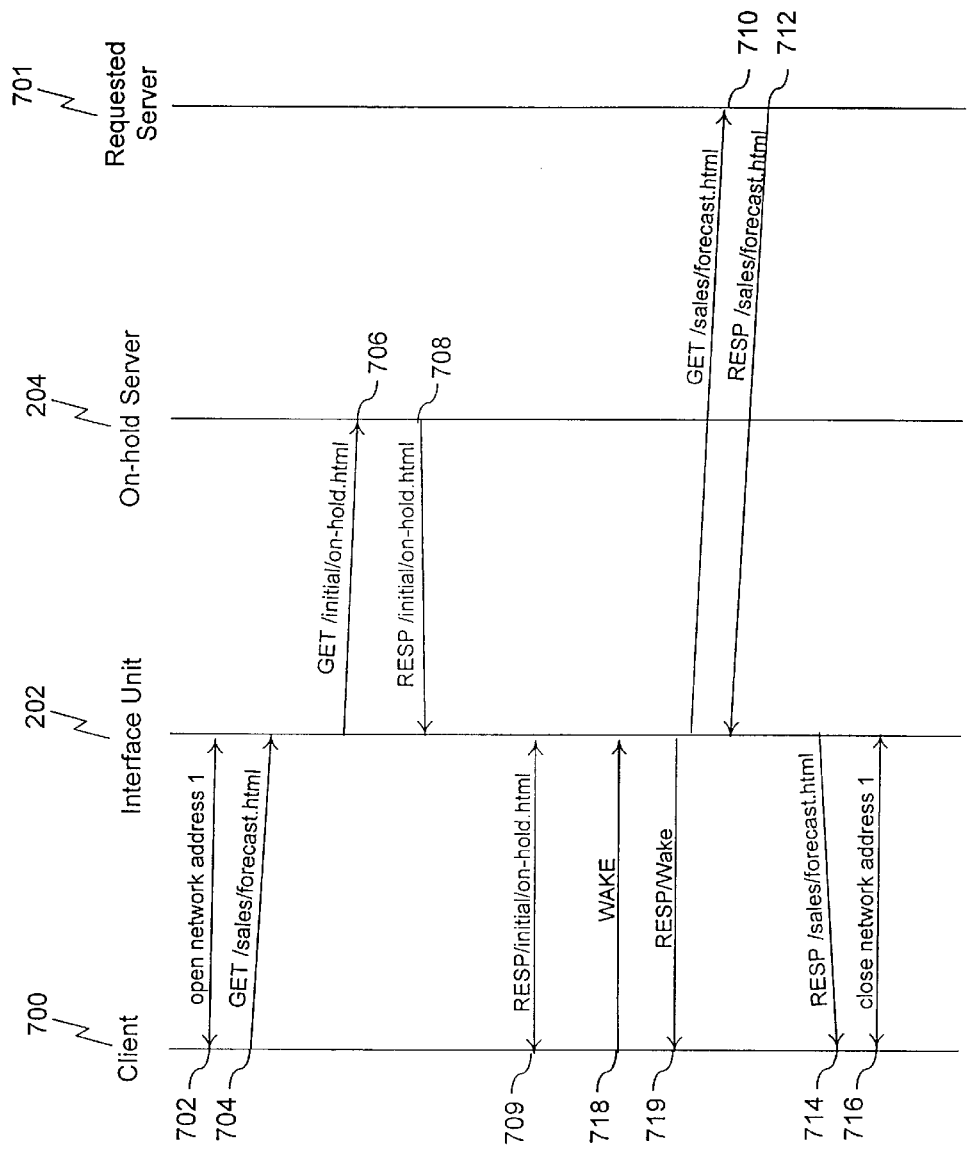
FIG. 7 is a message flow diagram illustrating the on-hold aspect of the present invention according to a preferred embodiment.

FIG. 7 is a message flow diagram illustrating the on-hold aspect of the present invention according to a preferred embodiment. FIG. 7 shows interface unit 202 connecting a client 700 to two servers, on-hold server 204 and a requested server 701. For this example, it is assumed that connections have previously been opened with on-hold server 204 and requested server 701, as described in detail in related pending application Ser. No. 09/188,709, filed Nov. 10, 1998, titled "Internet Client-Server Multiplexer." However, it should be noted that the present invention can be implemented independent of the "connection pooling" and "connection multiplexing" techniques described in the just referenced pending application.

First, interface unit 202 opens a connection with client 700 using network address 1 provided by client 700, as shown by flow 702. Once the connection is opened, interface unit 202 receives a GET request from client 700 specifying a path name of/sales/forecast.html, as shown by flow line 704. Assume at this point, interface unit 202 determines that the GET request is for requested server 701 and that the estimated response time for requested server 701 is such that client 700 must be put on-hold.

Because a free connection is open between interface unit 202 and on-hold server 204, interface unit 202 does not open a further connection with on-hold server 204. Interface unit 202 maps the appropriate GET on-hold request to on-hold server 204. For example, interface unit 202 can include a table that maps each client to that client's customized on-hold request, if applicable, else it can use the default on-hold request. Interface unit 202 forwards the GET on-hold request to on-hold server 204, as shown by flow line 706. On-hold server 204 responds with the requested web page, as shown by flow line 708. Interface unit 202 forwards the web page to client 700, as shown by flow line 709. According to the connection pooling feature utilized by the present invention, interface unit 202 does not close the connection with on-hold server 204, but rather keeps it open to accommodate further data flows.

In a preferred embodiment of the present invention, the web page forwarded to client 700 by interface unit 202 (from on-hold server 204) contains two frames. One of the frames contains the Java Applet/Script which monitors the response time and computes the waiting time. The other frame displays the information from on-hold server 204.

Once interface unit 202 determines that client 700 is ready to be taken off on-hold (as described in FIG. 5), the GET request from client 700 specifying a path name of /sales/ forecast.html is sent or replayed to requested server 701, as shown by flow line 710. But, prior to this, client 700 sends a WAKE command to interface unit 202 and interface unit 202 responses back to client 700, as shown by flow line 718 and 719, respectively. Next, requested server 701 responds with the requested web page, as shown by flow line 712. Interface unit 202 forwards the web page to client 700, as shown by flow line 714. Finally, interface unit 202 closes the connection with client 700 using network address 1, as shown by flow line 716.

Figure 8:
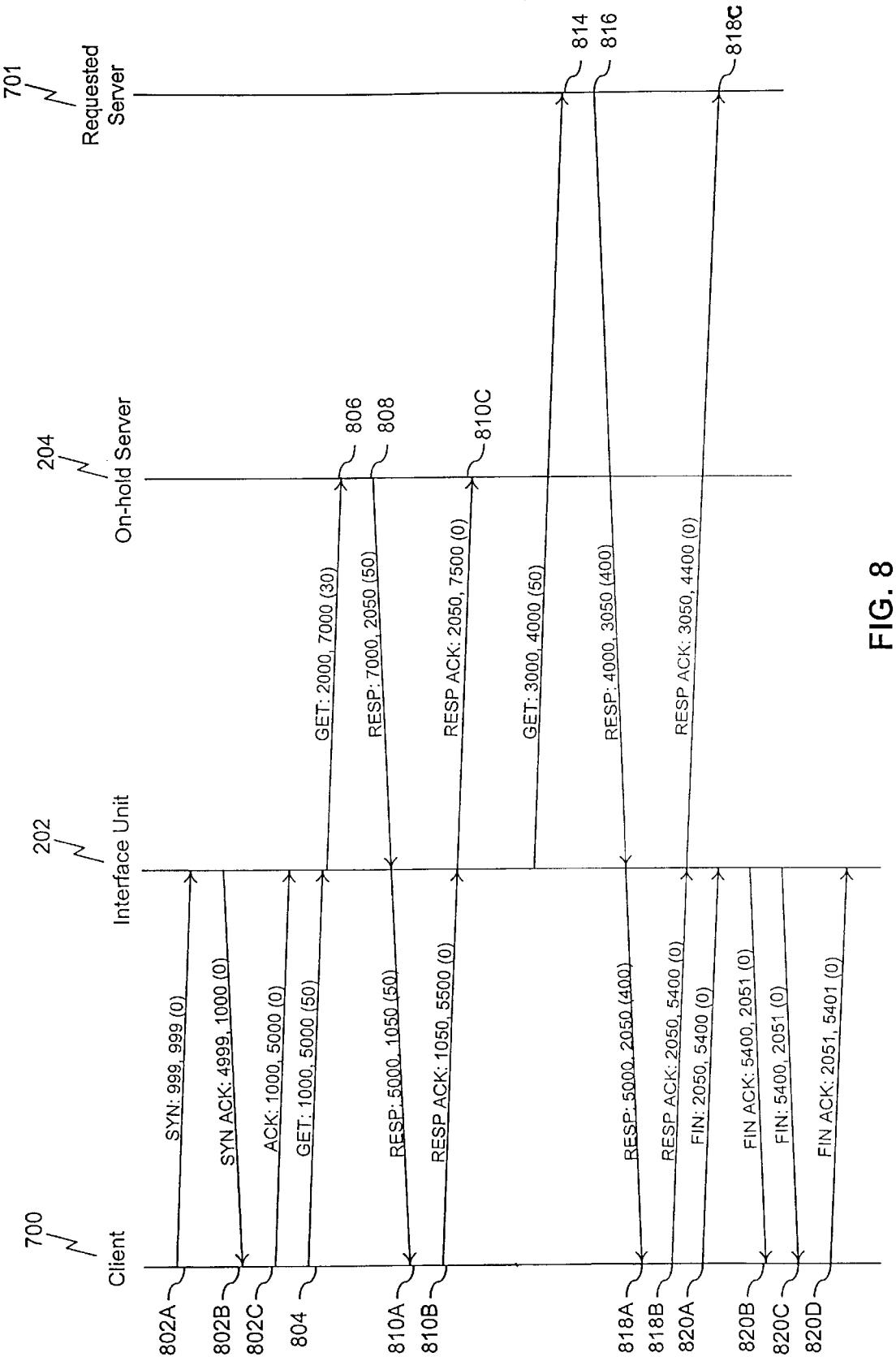
FIG. 8 is a detailed flow diagram illustrating the translations of acknowledgment and sequence numbers performed by the present invention in the example of FIG. 7 according to a preferred embodiment.

FIG. 8 is a detailed flow diagram illustrating the translations of acknowledgment and sequence numbers performed by the present invention in the example of FIG. 7 (with the exclusion of flows 718 and 719) according to a preferred embodiment. The flows of FIG. 8 correspond to flows 702 through 716 of FIG. 7.

Flows 802A, B, C correspond to flow 702 and present a method of opening the connection between client 700 and interface unit 202. Client 700 has established a starting sequence number of 999 and an acknowledgment number of 999. Interface unit 202 responds with a SYN ACK segment specifying a starting sequence number of 4999 and incrementing the acknowledgment number to 1000, as shown by flow 802B. Client 700 responds with an ACU segment specifying a sequence number of 1000 and incrementing the acknowledgment number to 5000, as shown by flow 802C. Client 700 then sends a GET segment specifying a length of 50 bytes, as shown by flow 804. As in HG. 7, assume at this point that interface unit 202 determines that the GET request is for requested server 701 and that the estimated current response time for requested server 701 is such that client 700 must be put on-hold.

Because a free open connection exists between interface unit 202 and on-hold server 204, interface unit 202 uses that connection rather than opening a new connection. Interface unit 202 maps the appropriate GET on-hold request to on-hold server 204 by modifying the sequence and acknowledgment numbers in the GET segment using the sequence and acknowledgment numbers from the previous segment transmitted over that connection. In this example, assume that those parameters are 2000 and 7000, respectively. Also, assume that the GET segment for the on-hold request has a length of 30 bytes. Accordingly, interface unit 202 forwards the GET segment to on-hold server 204 using sequence number 2000, acknowledgment number 7000, and length 30, as shown by flow line 806.

On-hold server 204 responds with the requested data specifying a sequence number of 7000, an acknowledgment number of 2050, and a length of 50, as shown by flow 808. Interface unit 202 receives the RESP segment, translates the sequence and acknowledgment numbers, and forwards the RESP segment to client 700, as shown by flow line 810A. Client 700 responds with a RESP ACK segment, as shown by flow 810B. Interface unit 202 modifies the acknowledgment and sequence numbers and forwards the RESP ACK segment to on-hold server 204, as shown by flow 810C.

Once interface unit 202 determines that client 700 is ready to be taken off on-hold (as described in FIG. 5), interface unit 202 replays the initial GET segment from client 700. Accordingly, because a free connection is already open with requested server 701, interface unit 202 uses that connection and translates the sequence and acknowledgment parameters of the GET segment using the parameters from the previous segment transmitted over that connection. In this example, assume that those parameters are 3000 and 4000, respectively. Accordingly, interface unit 202 forwards the GET segment to requested server 701 using sequence number 3000, acknowledgment number 4000, and length 50, as shown by flow line 814.

Requested server 701 responds with the requested data specifying a sequence number of 4000, an acknowledgment number of 3050, and a length of 400, as shown by flow 816. Interface unit 202 receives the RESP segment, translates the sequence and acknowledgment numbers, and forwards the RESP segment to client 700, as shown by flow line 818A. Client 700 responds with a RESP ACK segment, as shown by flow 818B. Interface unit 202 modifies the acknowledgment and sequence numbers and forwards the RESP ACK segment to requested server 701, as shown by flow 818C. Finally, the connection between interface unit 202 and client 700 is closed, as shown in flows 820A, B, C, D.

Figure 10:
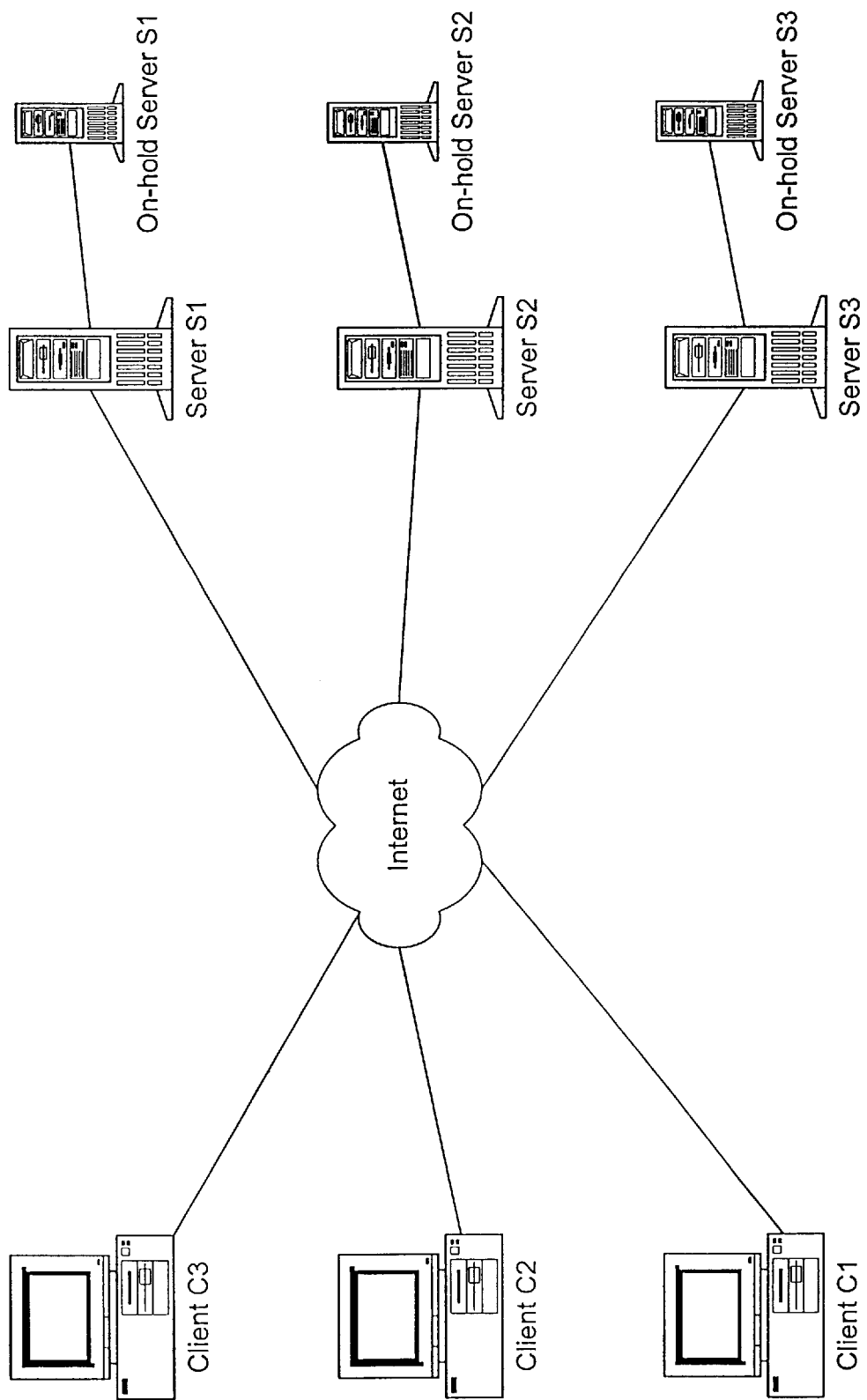
FIG. 10 is a network context diagram where each server has the intelligence of the interface unit to put a client on-hold and has its own on-hold server according to an embodiment of the present invention.

As mentioned above, another embodiment of the present invention does not include interface unit 202, as described above. Here each server incorporates similar intelligence as described above for interface unit 202 and has its own on-hold server, as shown in FIG. 10.

Figure 9:
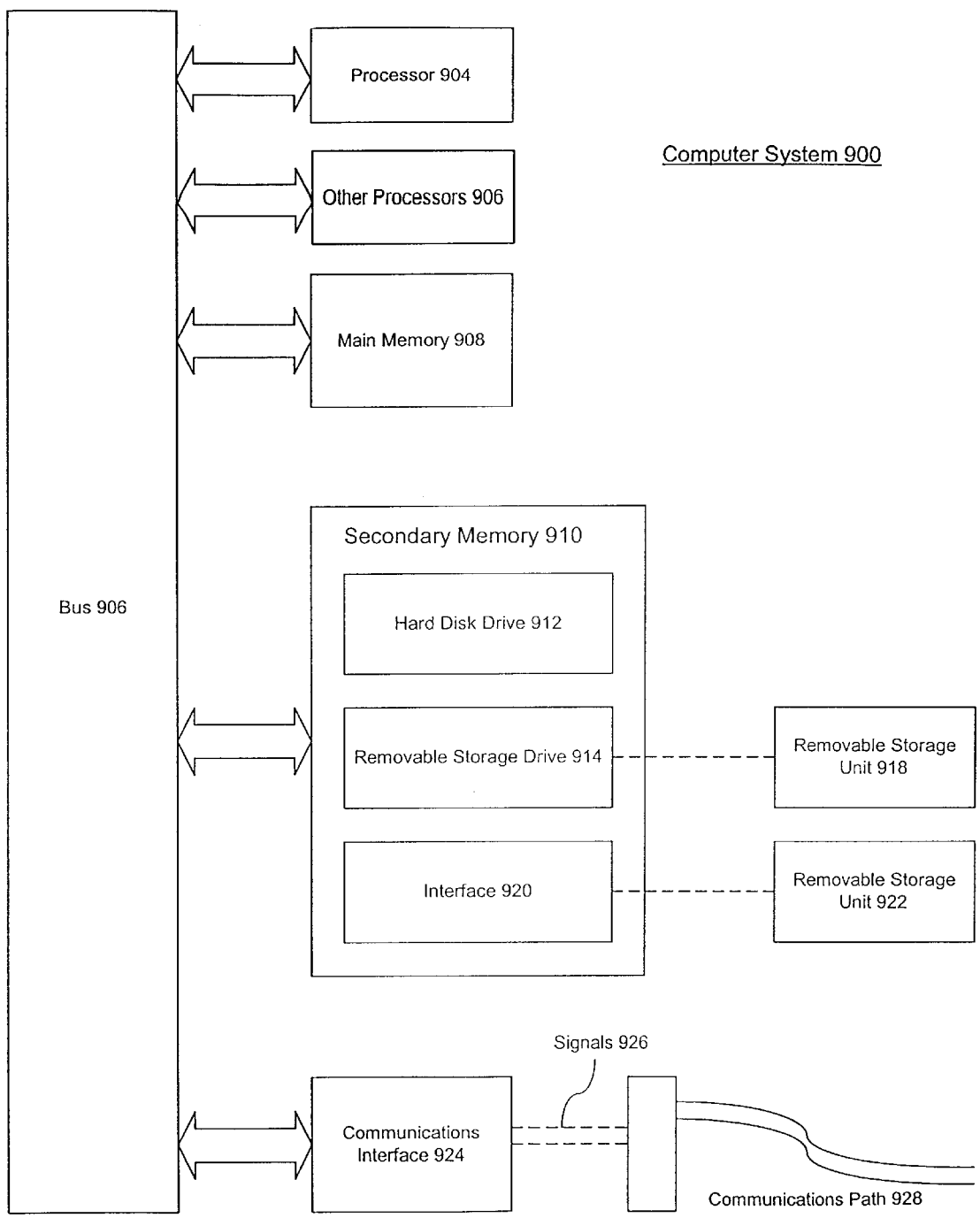
FIG. 9 depicts an example computer system in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 900 is shown in FIG. 9. The computer system 900 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM) and can also include a secondary memory 910. The secondary memory 1010 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912 and signals 926. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The present invention is described specifically when implemented within an interface unit, such as interface unit 202, that is connected to servers in a farm for the purpose of offloading connection processing overhead from the servers. However, the present invention can also be applied within other kinds of devices that are in the network connection path between the client and the servers. As network traffic flows through such devices, they all have the opportunity to apply the present invention to offload connection processing. Some examples of such devices are:

Load Balancers which distribute client network connections between a set of servers in a server farm (local or geographically distributed). The invention can readily be combined with the load balancing function.

Bandwidth managers which monitor network traffic and meter packet flow. These devices can also use the present invention.

Firewalls monitor packets and allow only the authorized packets to flow through. The present invention can be used to provide an additional feature within firewalls.

Routers and switches also lie in the path of the network traffic. The industry trend is to integrate additional functionality (such as load balancing, bandwidth management and firewall functionality) within these devices. Hence, the present invention can easily be incorporated into a router.

The specific integration of the present invention into each one of the above devices is implementation specific.

The present invention can also be applied within computer systems which are the end points of network connections. In this case, add-on cards can be used to implement the invention and thus offload the main processing elements within the computer system.

Conclusion

The previous description of the preferred embodiments is provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for guaranteeing network performance, comprising:
    means for opening a connection between a client and an interface unit;
    means for opening a connection between said interface unit and a requested server if no free connection is open between said interface unit and said requested server;
    means for estimating a response time of said requested server once a connection is established for said client;
    means for putting said client on-hold if said response time is more than a threshold value;
    means for determining when said client should be taken off on-hold;
    means for allowing said client to access information on said requested server via said connections and said interface unit once said client is taken off on-hold; and
    means for closing said connection between said client and said interface unit while keeping open said connection between said interface unit and said requested server.

2. The apparatus of claim 1, further comprising means for taking said client off on-hold once said response time is less than or equal to said threshold value.

3. The apparatus of claim 1, wherein said means for opening said connection between said client and said interface unit comprises:
    means for receiving a request to open a connection using a network address corresponding to said interface unit or said requested server; and
    means for receiving a request to retrieve data using a path name corresponding to said requested server.

4. The apparatus of claim 3, wherein said means for opening said connection between said client and said interface unit comprises:
    means for selecting said requested server as a function of said network address.

5. The apparatus of claim 4, wherein said means for allowing comprises:
    means for retrieving said data from said requested server using said path name.

6. The apparatus of claim 5, wherein said means for allowing further comprises:
    means for sending said data to said client.

7. The apparatus of claim 6, wherein:
    said means for receiving a request to retrieve data comprises means for receiving a GET segment having sequence and acknowledgment parameters; and
    said means for retrieving comprises
        means for modifying said parameters to produce a modified GET segment, and
        means for sending said modified GET segment to said requested server.

8. The apparatus of claim 1, wherein said means for putting said client on-hold if said response time is more than a threshold value comprises:
    means for determining a waiting time for said client;
    means for determining an on-hold request based on said determined waiting time; and
    means for allowing said client to access information on an on-hold server based on said determined on-hold request.

9. The apparatus of claim 8, wherein said means for determining said on-hold request comprises:
    means for allowing said client to customize said on-hold request.

10. The apparatus of claim 9, wherein said means for allowing said client to customize comprises:
  means for returning to said client a dual framed/multi-window web page, wherein said dual framed/multi-window web page includes a first frame/window and a second frame/window; and
  means for allowing said client to select at least one category in said first frame/window thereby configuring the contents of said second frame/window.

11. The apparatus of claim 1, wherein said means for determining when said client should be taken off on-hold comprises:
  means for recalculating said response time for said requested server;
  means for determining whether said client is next to be serviced by said requested server;
  means for determining when said client is finished with said on-hold server; and
  means for taking said client off on-hold based on said means for recalculating, said means for determining whether said client is next to be serviced, and said means for determining when said client is finished.

12. A method for guaranteeing network performance, comprising the steps of:
  opening a connection between a client and an interface unit;
  opening a connection between said interface unit and a requested server if no free connection is open between said interface unit and said requested server;
  estimating a response time of said requested server once a connection is established for said client;
  putting said client on-hold if said response time is more than a threshold value;
  determining when said client should be taken off on-hold;
  allowing said client to access information on said requested server via said connections and said interface unit once said client is taken off on-hold; and
  closing said connection between said client and said interface unit while keeping open said connection between said interface unit and said requested server.

13. The method of claim 12, wherein the step of opening said connection between said client and said interface unit step comprises the steps of:
  receiving a request to open a connection using a network address corresponding to said interface unit or said requested server; and
  receiving a request to retrieve data using a path name corresponding to said requested server.

14. The method of claim 13, wherein the step of opening said connection between said client and said interface unit further comprises the step of:
  selecting said requested server as a function of said network address.

15. The method of claim 14, wherein the step of allowing comprises the step of:
  retrieving said data from said requested server using said path name.

16. The method of claim 15, wherein the step of allowing further comprises the step of:
  sending said data to said client.

17. The method of claim 16, wherein:
  the step of receiving a request to retrieve data comprises the step of receiving a GET segment having sequence and acknowledgment parameters; and
  the step of retrieving comprises the steps of
    modifying said parameters to produce a modified GET segment, and
    sending said modified GET segment to said requested server.

18. The method of claim 12, wherein the step of putting said client on-hold comprises of steps of:
  determining a waiting time for said client;
  determining an on-hold request based on said determined waiting time; and
  allowing said client to access information on an on-hold server based on said determined on-hold request.

19. The method of claim 18, wherein the step of putting said client on-hold further comprises the step of:
  allowing said client to customize said on-hold request.

20. The method of claim 19, wherein the step of allowing said client to customize comprises the steps of:
  returning to said client a dual framed/multi-window web page, wherein said dual framed/multi-window web page includes a first frame/window and a second frame/window; and
  allowing said client to select at least one category in said first frame/window thereby configuring the contents of said second frame/window.

21. The method of claim 12, wherein the step of determining when said client should be taken off on-hold comprises the steps of:
  recalculating said response time for said requested server;
  determining whether said client is next to be serviced by said requested server;
  determining when said client is finished with said on-hold server; and
  taking said client off on-hold based on the step of recalculating, the step of determining whether said client is next to be serviced, and the step of determining when said client is finished.

22. The method of claim 12, further comprising taking said client off on-hold once said response time is less than or equal to said threshold value.

* * * * *